United States Patent
Eun et al.

(10) Patent No.: US 8,133,636 B2
(45) Date of Patent: Mar. 13, 2012

(54) FUEL CELL STACK AND MANUFACTURING METHOD OF THE SAME

(75) Inventors: Yeong-chan Eun, Suwon-si (KR); Seong-jin An, Suwon-si (KR); Jun-ho Sauk, Suwon-si (KR); Gill-tae Roh, Suwon-si (KR); Seok-rak Chang, Suwon-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 781 days.

(21) Appl. No.: 12/034,077

(22) Filed: Feb. 20, 2008

(65) Prior Publication Data

US 2008/0254332 A1 Oct. 16, 2008

(30) Foreign Application Priority Data

Apr. 12, 2007 (KR) .................. 10-2007-0036062

(51) Int. Cl.
*H01M 2/08* (2006.01)
*H01M 8/24* (2006.01)

(52) U.S. Cl. .............. 429/509; 429/463; 429/469

(58) Field of Classification Search .............. 429/452, 429/456–458, 460, 463, 507–511, 467–470
See application file for complete search history.

(56) References Cited

U.S. PATENT DOCUMENTS

| | | | |
|---|---|---|---|
| 4,182,795 A * | 1/1980 | Baker et al. ............... | 429/433 |
| 4,604,331 A | 8/1986 | Louis | |
| 5,256,499 A * | 10/1993 | Minh et al. ............... | 429/460 |
| 6,861,171 B1 * | 3/2005 | Suzuki ..................... | 429/510 |
| 2001/0019790 A1 * | 9/2001 | Regan et al. ............ | 429/35 |
| 2001/0055708 A1 | 12/2001 | Krasij et al. | |
| 2002/0068212 A1 | 6/2002 | Osenar et al. | |
| 2004/0209136 A1 * | 10/2004 | Ren et al. ................ | 429/30 |
| 2005/0079400 A1 * | 4/2005 | Sugiura et al. .......... | 429/35 |

FOREIGN PATENT DOCUMENTS

| | | |
|---|---|---|
| JP | 61-39458 | 2/1986 |
| JP | 2002-231264 | 8/2002 |
| JP | 2004-39385 | 2/2004 |
| JP | 2007-9937 | 1/2007 |

OTHER PUBLICATIONS

Notice of Allowance issued in corresponding Korean Patent Application No. 2007-0036062 dated Mar. 3, 2008.

* cited by examiner

*Primary Examiner* — Basia Ridley
*Assistant Examiner* — James Lee
(74) *Attorney, Agent, or Firm* — Knobbe, Martens, Olson & Bear LLP

(57) ABSTRACT

A fuel cell stack includes a membrane electrode assembly including an anode electrode, a cathode electrode, and an electrolyte membrane positioned between the anode electrode and the cathode electrode; a separator including a channel for a flow of fuel and oxidant and closely adhered to the membrane electrode assembly; and a gasket with a two-layer structure stacked between the separator and the membrane electrode assembly.

13 Claims, 5 Drawing Sheets

FUEL CELL STACK AND MANUFACTURING METHOD OF THE SAME

CROSS-REFERENCE TO RELATED APPLICATION

This application claims the benefit of Korean Application No. 2007-36062, filed Apr. 12, 2007, in the Korean Intellectual Property Office, the disclosure of which is incorporated herein by reference.

BACKGROUND OF THE INVENTION

1. Field of the Invention

Aspects of the present invention relate to a polymer electrolyte membrane fuel cell, and more particularly, to a fuel cell stack and manufacturing method thereof including a new sealing structure.

2. Description of the Related Art

Since fuel cells are pollution-free power sources, fuel cells have been spotlighted as next generation clean energy power generation systems. Fuel cells have advantages in that a power generation system using the fuel cell can be used as a self-generator for a large building, as a power supply for an electric vehicle, as a portable power supply, etc., and can use various fuels such as natural gas, city gas, naphtha, methanol, waste gas, etc. Types of fuel cells, which basically operate by the same principles, include phosphoric acid fuel cells, alkaline fuel cells, polymer electrolyte membrane fuel cells (PEMFC), direct methanol fuel cells, and solid oxide fuel cells, in accordance with types of electrolytes used in the fuel cell.

Since s polymer electrolyte membrane fuel cell (PEMFC) uses a polymer membrane as an electrolyte, the polymer electrolyte membrane has no risk of corrosion or evaporation due to the electrolyte and can obtain high current density per unit area. Moreover, since the polymer electrolyte membrane fuel cell has a high output characteristic and low operating temperature, as compared to other kinds of fuel cells, the polymer electrolyte membrane fuel cell has actively been developed as a portable power supply to supply power to a vehicle, a distributed power supply to supply power to a house or a public building, etc., and a small power supply to supply power to electronic equipment, etc.

The polymer electrolyte membrane fuel cell is typically manufactured in a stack structure by stacking a plurality of membrane electrode assemblies (MEAs), each constituted by an anode electrode, a cathode electrode and a polymer electrolyte membrane positioned between the anode electrode and the cathode electrode, wherein separators are interposed between the membrane electrode assemblies. In manufacturing the fuel cell stack, a sealant is inserted between the membrane electrode assembly and the separator to prevent the leakage of fuel or oxidant flowing through a channel installed in the separator and to prevent the influx of outside air.

In general, the fuel cell stack is sealed by discharging, hardening, and compressing (or discharging, compressing, then hardening) materials that have some elasticity, such as resin, etc., or by using an O-ring type gasket. However, performing the discharge, hardening, and compression of elastic materials has the disadvantages that it takes a long time to harden the materials and it is difficult to maintain uniform discharge state. If discharging and compressing are carried out before hardening, there are disadvantages that since the stack is assembled before the relatively thickly applied sealant material, which may be relatively thickly applied, is hardened, the parts of the stack may not be precisely and firmly seated in situ so that the membrane electrode assembly or the separator may be polluted by sealant that migrates from the sealing area. In particular, when the parts of the stack are polluted with sealant, the waste of the parts of the stack is increased. Also, sealing a fuel cell stack using an O-ring type of the gasket has the disadvantages that the design of the stack and the manufacturing process thereof are restricted by constraints on the manufacture of the gasket. Therefore, in the existing fuel cell stack a sealing method using an O-ring has the problems that cracks can occur in the parts of the fuel cell stack or between the parts of the fuel cell stack by outside impact because of the particular material or structure of the parts used in the fuel cell stack, so that leakage occurs.

SUMMARY OF THE INVENTION

Aspects of the present invention provide a fuel cell stack and manufacturing method thereof including a gasket having a structure that prevents fuel or oxidant from being leaked to the outside and prevents parts of the fuel cell stack from being polluted and further reduces the risk of leakage to outside impact or cracking of parts of the fuel cell.

According to an embodiment of the present invention, there is provided a fuel cell stack including: a membrane electrode assembly comprising an anode electrode, a cathode electrode, and an electrolyte membrane positioned between the anode electrode and the cathode electrode; a separator including at least one channel for a flow of fuel and/or oxidant and being closely adhered to the membrane electrode assembly; and a gasket with a two-layer structure stacked between the separator and the membrane electrode assembly.

According to a non-limiting aspect, first and second layers of the gasket may be composed of the same material. Alternatively, the first and second layers of the gasket may be composed of different materials.

According to a non-limiting aspect, the first layer of the gasket may be positioned on a separator side, and the second layer of the gasket may have a lesser thickness than that of the first layer.

According to a non-limiting aspect, the separator may include a seat groove in which the gasket is firmly seated.

According to a non-limiting aspect, the fuel may be a liquid state fuel such as methanol and/or a gas state fuel such as hydrogen gas.

According to another embodiment of the present invention, there is provided a fuel cell stack comprising: a plurality of stacked membrane electrode assemblies; a plurality of separators, each separator including at least one channel for a flow of fuel and/or oxidant and being closely adhered to one of the membrane electrode assemblies; and a plurality of gaskets, each gasket having a two-layer structure and being stacked between one of the separators and one of the membrane electrode assemblies.

According to another embodiment of the present invention, there is provided a fuel cell stack comprising: at least one membrane electrode assembly comprising an anode electrode, a cathode electrode and an electrolyte membrane positioned between the anode electrode and the cathode electrode; for each membrane assembly, a first separator that adheres to the membrane electrode assembly at a side of the electrolyte membrane having the anode electrode and a second separator that adheres to the membrane electrode at a side of the electrolyte membrane having the cathode electrode; and for each membrane assembly, a first gasket with a two-layer structure stacked between the separator and the membrane electrode assembly at the side having the anode electrode and a second gasket with a two-layer structure stacked between the separator and the membrane electrode assembly at the side having the cathode electrode.

According to embodiment of the present invention, there is provided a manufacturing method of a fuel cell stack comprising: preparing a membrane electrode assembly comprising an anode electrode, a cathode electrode, and an electrolyte membrane positioned between the anode electrode and the cathode electrode; preparing a separator including at least one channel for a flow of fuel and/or oxidant and joined to the membrane electrode assembly; forming a first layer of a gasket on the separator; applying a second layer of a gasket on the first layer of the gasket; and bonding the separator and the membrane electrode assembly prior to hardening the second layer of the gasket.

According to a non-limiting aspect, the forming the first layer of the gasket on the separator includes applying and then hardening a gasket material in a semi-hardened state on the separator. Alternatively, the forming the first layer of the gasket on the separator may include putting a gasket material in a hardened state on the separator.

According to a non-limiting aspect, the preparing of the separator can include forming a seat groove in which the first layer of the gasket is fixed.

According to a non-limiting aspect, the bonding of the separator and the membrane electrode assembly can include positioning a pair of end plates at opposite ends of the fuel cell stack and applying a a coupling device to exert a bonding pressure on the separator, the membrane electrode assembly and the gasket.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
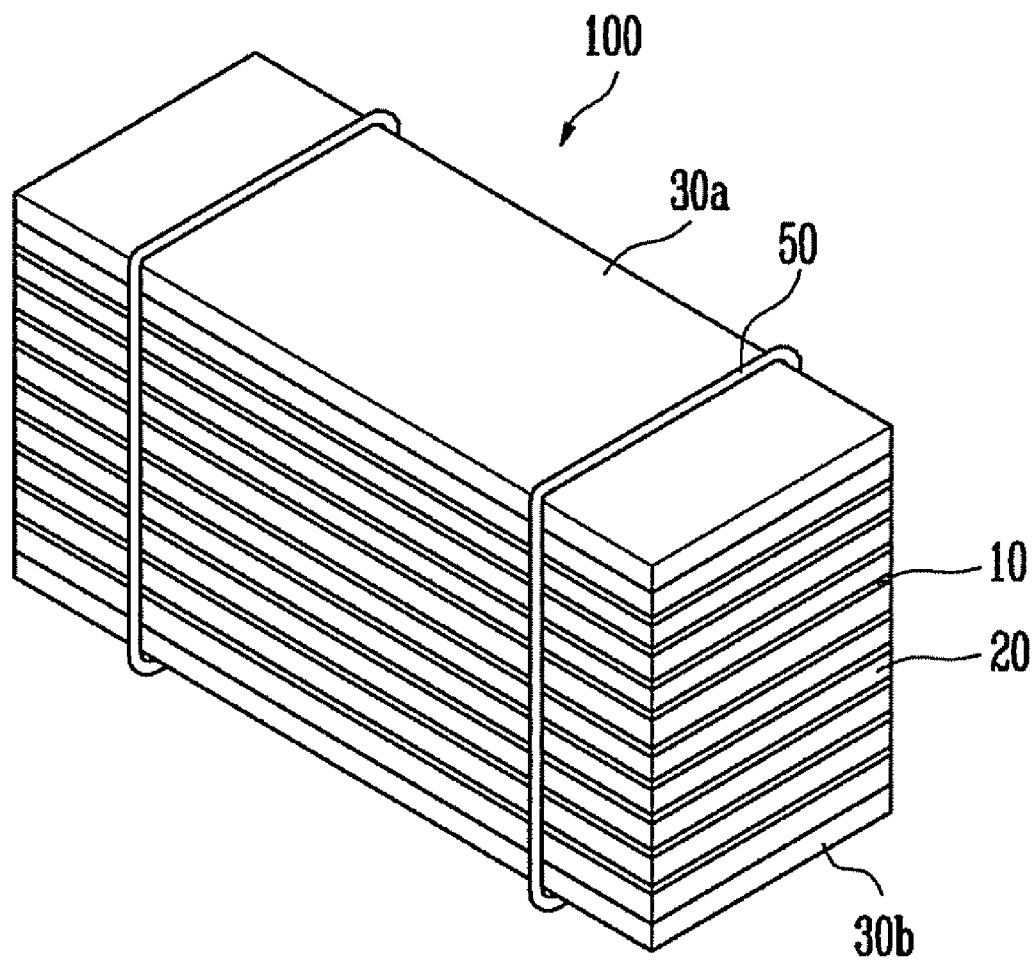
FIG. 1 is a schematic perspective view of a fuel cell stack according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures. In the drawings, the thickness and the size of constituents may be exaggerated for the convenience and the clearness of explanation.

FIG. 1 is a schematic perspective view of a fuel cell stack according to an embodiment of the present invention. The fuel cell stack includes a plurality of membrane electrode assemblies (MEAs) 10, bipolar plate (BP) 20 between adjacent MEAs, two monopolar plates, a pair of end plates 30a and 30b, a gasket to be described below, and a coupling device 50. It is to be understood that aspects of the present invention as described herein may apply to the fuel cell that has only a single cell.

The fuel cell stack 100 of the present embodiment is characterized in that in manufacturing the stack, a gasket installed between an electrolyte membrane of the MEA 10 and the bipolar plate 20 is formed in a two-layer structure. The gasket will be described below.

Figure 2A:
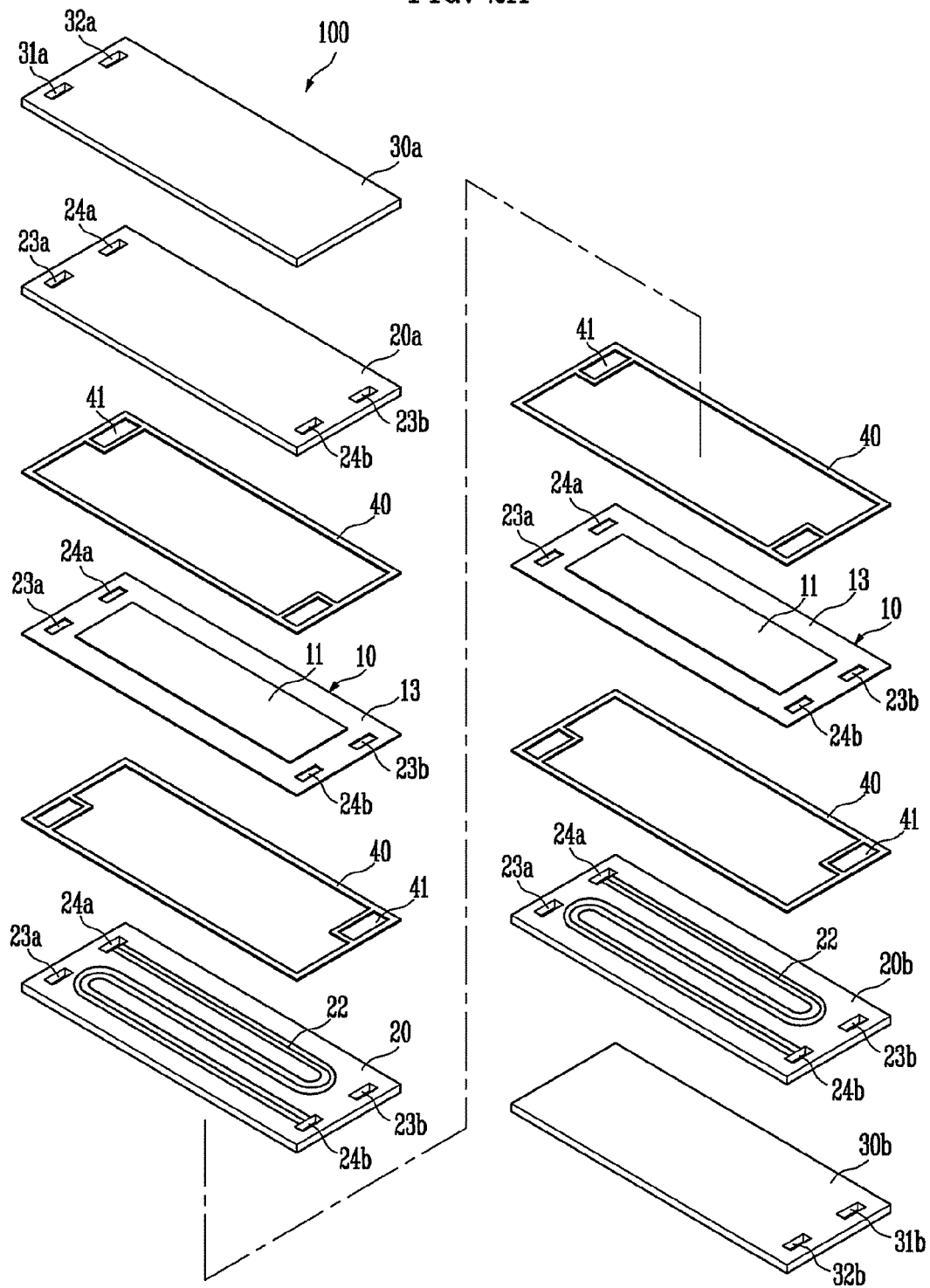
FIG. 2A is an exploded perspective view of a fuel cell stack of FIG. 1.
Figure 2B:
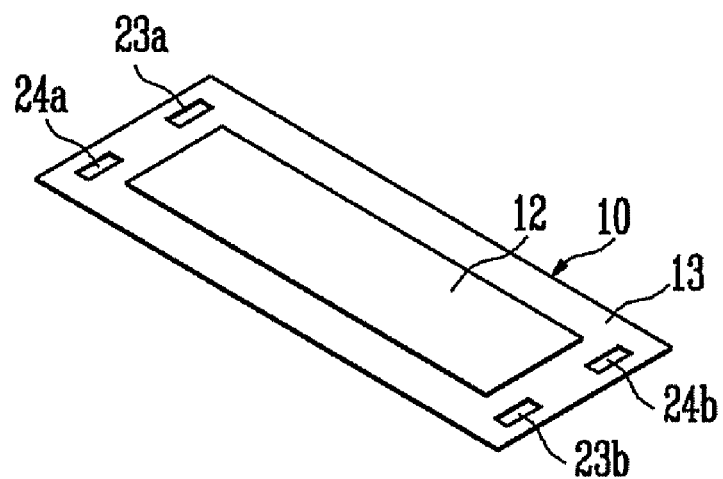
FIG. 2B is a perspective view of an MEA of the fuel cell stack of FIG. 1.

FIG. 2A is an exploded perspective view representing a fuel cell stack 100 of FIG. 1. FIG. 2B is a perspective view of an MEA 10 of the fuel cell stack of FIG. 1, and FIG. 2C is a perspective view of a bipolar plate 20 of the fuel cell stack of FIG. 1.

Figure 2C:
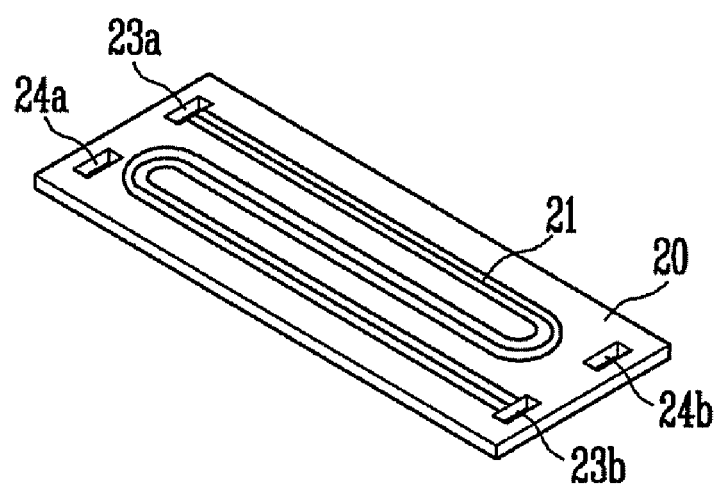
FIG. 2C is a perspective view of a bipolar plate of the fuel cell stack of FIG. 1.

Referring to FIGS. 2A to 2C, the MEA 10 of the fuel cell stack includes an anode electrode 11, a cathode electrode 12, and an electrolyte membrane 13 positioned between the anode electrode 11 and the cathode electrode 12. The electrolyte membrane 13 includes an opening unit that forms fuel manifolds 23a and 23b and oxidant manifolds 24a and 24b.

The anode electrode 11 may be constituted by a catalyst layer, a microporous layer, and a backing layer. Similarly, the cathode electrode 12 may be constituted by a catalyst layer, a microporous layer, and a backing layer.

The catalyst layers of the anode electrode 11 and the cathode electrode 12 perform a reaction promoting role to chemically and rapidly react a supplied fuel or oxidant. As a non-limiting example, the catalyst layer may include at least one metal catalyst selected from the group consisting of platinum, ruthenium, osmium, an alloy of platinum-ruthenium, an alloy of platinum-osmium, an alloy of platinum-palladium, and an alloy of platinum-M (M is at least one transition metal selected from a group consisting of Ga, Ti, V, Cr, Mn, Fe, Co, Ni, Cu, and Zn). The catalyst may be impregnated in a carrier. Any materials with conductivity, such as, for example carbon, can be used as the carrier.

The microporous layers of the anode electrode 11 and the cathode electrode 12 function to uniformly distribute and supply fuel or oxidant to their respective catalyst layers and/or to exhaust reactants. Moreover, the microporous layer of the cathode functions to smoothly exhaust water generated from the catalyst layer of the cathode. The respective microporous layers described above can be carbon layers coated on respective backing layers. Also, the respective microporous layers may include at least one carbon material selected from the group consisting of graphite, carbon nano tube (CNT), fullerene (C60), activated carbon, carbon black, such as, for example, carbon black available under the tradename VULCAN from Cabot Corp. or ketjen black, and carbon nano horn, and may further include at least one binder selected from the group consisting of poly(perfluorosulfonic acid), poly(tetrafluoroethylene), and fluorinated ethylene-propylene.

The backing layers of the anode electrode 11 and the cathode electrode 12 function to back the respective catalyst layers and at the same time, to distribute fuel, water, air, etc., to collect electricity generated, and to prevent loss of materials in the respective catalyst layers. The backing layers described above can be implemented by carbon base materials, such as carbon cloth, carbon paper, etc.

capable of being manufactured as The electrolyte membrane 13 may comprise a proton conductive polymer such as, for example, a fluoro-based polymer, a ketone-based polymer, a benzimidazole-based polymer, an ester-based polymer, an amide-based polymer, an imide-based polymer, a sulfonic polymer, a styrene-based polymer, a hydro-carbonaceous polymer, etc. Specific non-limiting examples of the proton conductive polymer include poly(perfluorosulfonic acid), poly(perfluorocarboxylic acid), a tetrafluoroethylene including a sulfonate group, a fluorovinylether copolymer, a defluorinated sulfide polyetherketone, an aryl ketone, poly (2,2'-(m-phenylene)-5,5'-bibenzimidazole), poly(2,5-benzimidazole), polyimide, polysulfone, polystyrene, polyphenylene, etc. However, the proton conductive polymer is not limited thereto. As a non-limiting example, the electrolyte membrane 13 may have a thickness of 0.1 mm or less to effectively pass through protons.

Solvent may be used to manufacture the electrolyte membrane 13. For example, a mixed solvent selected from the group consisting of ethanol, isopropylalcohol, n-propylalcohol, a butylalcohol, water, dimethylsulfoxide (DMSO), dimethylacetamide (DMAc), and N-methylpyrrolidone (NMP).

Referring back to FIGS. 2A to 2C, the bipolar plate 20 of the fuel cell stack 100 according to the present embodiment forms a channel to supply fuel, such as hydrogen, etc., or oxidant, such as oxygen, etc., to the MEA 10, and at the same time, functions as a connector electrically connecting neighboring single cells. To this end, one surface of the bipolar plate 20 is provided with a fuel flow field 21 and the other surface thereof is provided with an oxidant flow field 22, each having a meandering shape. The fuel flow field 21 and the oxidant flow field 22 can be formed in various shapes other than the meandering shape and can be formed in different shapes from each other.

Further, the fuel cell stack 100 according to the present embodiment includes a first monopolar plate 20a, which has one surface provided with the fuel flow field 21, and a second monopolar plate 20b, which has one surface provided with the oxidant flow field 22. The first monopolar plate 20a is installed so that the fuel flow field 21 is opposite to the anode electrode 11 of the MEA 10 positioned at one outermost side in a stacked direction, and the second monopolar plate 20b is installed so that the oxidant flow field 22 is opposite to the cathode electrode 12 of the MEA 10 positioned at the other outermost side in a stacked direction. The first and second monopolar plates 20a and 20b will not be mentioned in detail in the following description. However, it is to be understood that description relating to the composition of the bipolar plate 20 and the sealing of the bipolar plate 20 to a membrane electrode assembly 10 may also apply to the composition of the monopolar plates 20a and 20b and the sealing of the monopolar plates 20a and 20b to their respective membrane electrode assemblies 10. Moreover, as used herein, the term "separator" is used generically to refer to the bipolar plate 20 or the monopolar plates 20a or 20b.

The bipolar plate 20 may comprise graphite, carbon, metal on which materials with excellent corrosion resistance are coated, or materials such alloy with strong corrosion resistance, etc. For example, the bipolar plate 20 may comprise a stainless steel core treated with conductive metal particulates that are projected on the surface of the stainless steel, penetrating through a passivity thin foil.

The stacked structure of the MEA 10 and the bipolar plate 20 as described above includes fuel manifolds 23a and 23b for the flow of fuel and oxidant manifolds 24a and 24b for the flow of oxidant. To this end, the respective MEAs 10 and the respective bipolar plates 20 include openings to form the fuel manifolds 23a and 23b and the oxidant manifolds 24a and 24b. The fuel manifolds 23a and 23b are connected to the fuel flow field 21 of the bipolar plate 20 and the oxidant manifolds 24a and 24b are connected to the oxidant flow field 22 of the bipolar plate 20.

Referring back to FIGS. 2A to 2C, the fuel cell stack according to the present embodiment includes the first end plate 30a positioned to the outside of the first monopolar plate 20a facing one outermost MEA 10 of the stacked structure the second end plate 30b positioned to the outside of the second monopolar plate 20b facing the other outermost MEA 10. The first end plate 30a is provided with a fuel inlet hole 31 a connected to the fuel manifold 23a and an oxidant inlet hole 32a connected to the oxidant manifold 24a. The second end plate 30b is provided with a fuel outlet hole 31 b connected to the fuel manifolds 23b and an oxidant outlet 32b connected to the oxidant 24b. The first end plate 30a and the second end plate 30b distribute pressure applied by a coupling device 50 to provide approximately uniform coupling pressure to both sides of the stack in a stacked direction of the stack and a direction opposed thereto. A metal strip, a bolt, or a nut, etc., may be used as the coupling device 50.

The first end plate 30a and the second end plate 30b as described above may be made of any suitable material such as, for example, mixed materials of glass filler and thermosetting resin and thermoplastic resin and materials used in the first and second monopolar plates 20a and 20b and polyphenylene sulfide (PPS). Alternatively or in addition, the inlet hole 31 a and the outlet hole 31 b for the fuel flow field and the inlet hole 32a and the outlet hole 32b for the oxidant flow field may be formed on the side of the stack structure, instead of penetrating through the pair of the end plates 30a and 30b. It is to be understood that a fuel cell stack according to aspects of the present invention may differ from what is described above. In particular, any fuel cell structure having a membrane electrode assembly and separator, such as, for example, a monopolar plate or bipolar plate, having fuel and oxidant flow channels may include a gasket formed with a two-layer structure according to aspects of the present invention.

The fuel cell stack 100 according to aspects of the present embodiment includes a gasket 40 positioned between the MEA 10 and the bipolar plate 20 to seal a diffusion layer of the MEA 10 that manages the flow of fuel. The gasket 40 includes openings 41 that correspond to an active region of the MEA 10 in which the anode electrode 11 or the cathode electrode 12 is formed, a region in which the fuel flow field 21 or the oxidant flow field of the bipolar plate 20 is formed, a region in which the fuel manifolds 23a and 23b are formed, and a region in which the oxidant manifolds 24a and 24b are formed. The gasket 40 as described above comprises materials with excellent elasticity and excellent stress retention with respect to a heat cycle, and in particular, is formed in a two-layer structure in order to ensure a robust sealing property.

Figure 3:
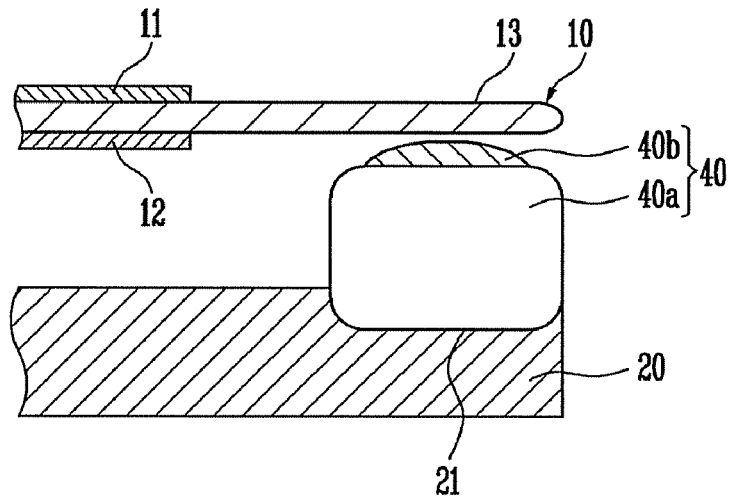
FIG. 3 is partially enlarged cross-sectional view showing a formation of a seal using a gasket adopted to a fuel cell stack according to the embodiment of the present invention.

FIG. 3 is partially enlarged cross-sectional view showing the formation of a seal using the gasket 40 Referring to FIG. 3, the gasket 40 according to aspects of the present invention is formed in a two-layer structure. A first layer 40a of the gasket 40 bonds to the bipolar plate 20 and a second layer 40b of the gasket 40 bonds to the electrolyte membrane 13. More specifically, the first layer 40a is positioned between the electrolyte membrane 13 and the bipolar plate 20 and takes a shape to properly seal the diffusion layer of the MEA 10 through which fuel or oxidant passes. The first layer 40a may comprise rubber or polymer, such as, for example, ethylenepropylene rubber (EPDM), silicon, silicon-based rubber and acryl-based rubber, a thermoplastic elastomer (TPE), etc. The second layer 40b is positioned on the first layer 40a and bonds the first layer 40a and the electrolyte membrane 13 of the MEA. The second layer 40b functions as an adhesive of the first layer 40a, after the first layer 40a is bonded to the separator 20, and the electrolyte membrane 13 of the MEA 10 in order to ensure sealing property. For this reason, the second layer 40b may be thinner than the first layer 40a. The second layer 40b may comprise rubber, acryl-based material or silicon-based material.

In order to easily align the first layer of the gasket 40a, the bipolar plate 20 according to aspects of the present invention may include a seat groove 21. The seat groove 21 can be provided on the corresponding surface of the separator by a predetermined number of grooves or slots or a concavity in a pattern corresponding to the first layer 40a of the gasket 40 so that the first layer 40a is disposed at a desired position.

Figure 4:
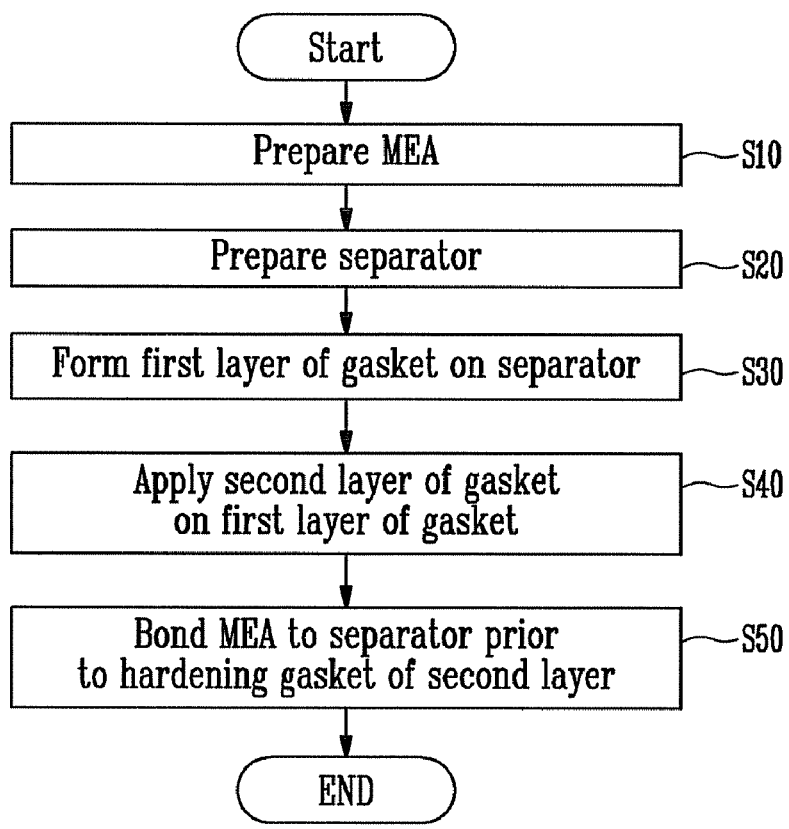
FIG. 4 is a flow chart of a manufacturing method of a fuel cell stack according to the embodiment of the present invention.

FIG. 4 is a flow chart of a manufacturing method of a fuel cell stack according to the embodiment of the present invention. In S10, a membrane electrode assembly (MEA) including an anode electrode, a cathode electrode, and an electrolyte membrane positioned between the anode electrode and the cathode electrode, is prepared. In S20, a separator including a channel for a flow of fuel or oxidant is prepared. Also in S20, a seat groove in which a first layer of a gasket will be fixed may be prepared. The separator may comprise graphite, carbon, metal on which the materials with excellent corrosion resistance are coated, or materials such alloys with strong corrosion resistance, etc.

In S30 the first layer of the gasket is fixed on the separator. The fixing of the gasket to the separator may include applying the gasket in a semi-hardened state on the prepared separator and then hardening the applied gasket with heat, ultraviolet rays, etc., or may include putting the gasket in a hardened state on the separator using a seat groove or an adhesive tape. As the materials usable for the first layer of the gasket, there are Ethylenepropylene rubber, silicon, silicon-based rubber, acryl-based rubber, etc., may be used for the first layer of the gasket.

In S40, a second layer is applied on the first layer of the gasket. The second layer of the gasket may use the same materials as the first layer of the gasket, or different materials therefrom. For example, ethylenepropylene rubber, silicon, silicon-based rubber, acryl-based rubber, etc., may be used for the second layer of the gasket.

In S50, the separator is bonded to the membrane electrode assembly prior to hardening the second layer of the gasket. The bonding of the separator to the membrane electrode assembly in the forming of a fuel cell stack may include positioning a pair of end plates at opposite ends of the fuel cell stack and applying a coupling device to press or hold the fuel cell stack together. In particular, the coupling device may exert a bonding pressure on the separator, membrane electrode assembly and gasket.

Figure 5:
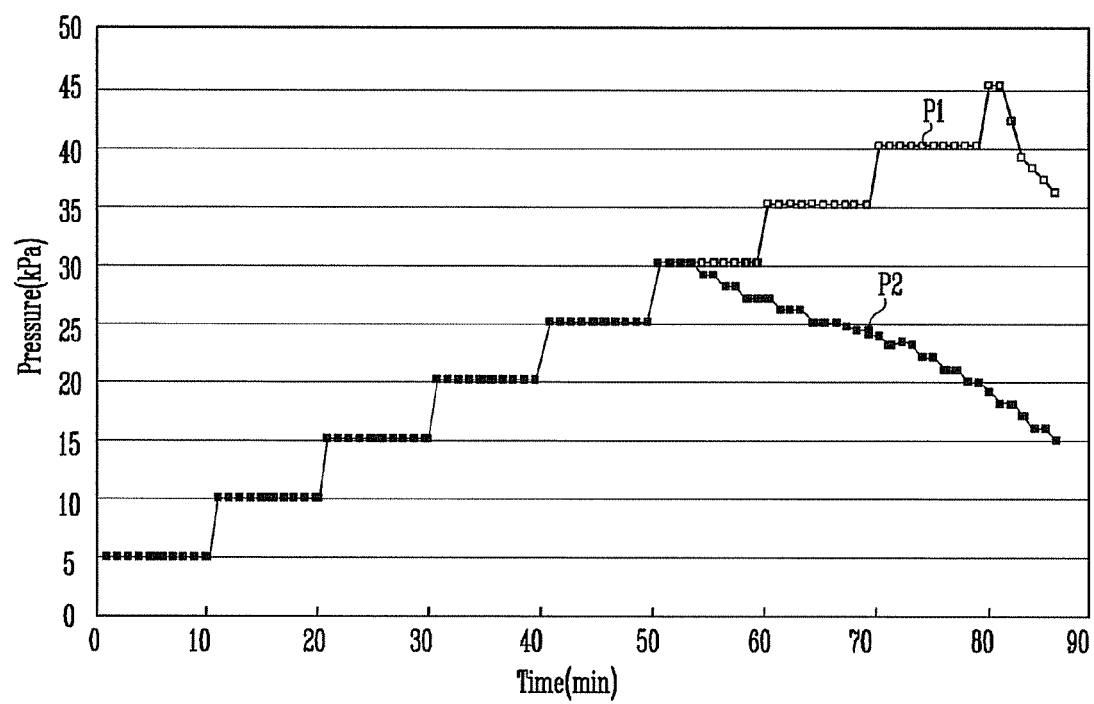
FIG. 5 is a graph showing the operating pressures in an experimental operation of a fuel cell stack according to the embodiment of the present invention and a fuel cell stack according to a comparative example.

FIG. 5 is a graph showing the operating pressure in an experimental operation of a fuel cell stack P1 including a gasket according to the embodiment of the present invention and a fuel stack P2 including a gasket having a one-layer structure according to a comparative example. In the experiment, the inside pressure of the two stacks was measured while incrementally increasing an applied pressure. In the comparative example fuel cell stack P2, leakage started to occur at 30 kPa while in the fuel cell stack P1 according to aspects of the present invention, leakage did not start to occur until the internal pressure reached 45 kPa. From these experimental results, it can be seen that the sealing property of the fuel cell stack according to aspects of the present invention can be improved by 30% or more over a fuel cell stack according to a comparative example. In order words, the sealing property and stability of the fuel cell stack according to aspects of the present invention are improved.

As described above, the sealing property of a fuel cell stack according to aspects of the present invention is improved, making it possible to prevent the leakage and mixing of fuel or oxidant and to ensure the sealing of liquid fuel such as a methanol solution as well as a gas fuel such as hydrogen gas. In addition, the risk of leakage due to the damage of the gasket caused by outside impact or cracks is reduced.

Although a few embodiments of the present invention have been shown and described, it should be appreciated by those skilled in the art that changes might be made in this embodiment without departing from the principles and spirit of the invention, the scope of which is defined in the claims and their equivalents.

What is claimed is:

1. A fuel cell stack, comprising:
a membrane electrode assembly comprising an anode electrode, a cathode electrode, and an electrolyte membrane positioned between the anode electrode and the cathode electrode;
a separator including at least one channel for a flow of fuel and/or oxidant and being closely adhered to the membrane electrode assembly, wherein the separator comprises a seat groove; and
a gasket comprising a first layer and a second layer structure stacked between the separator and the membrane electrode assembly, wherein the first layer is seated in the seat groove, wherein a thickness of the first layer is greater than a thickness of the second layer, wherein the second layer contacts the membrane electrode assembly, and wherein the first layer directly contacts the membrane electrode assembly around the second layer in at least two places.

2. The fuel cell stack of claim 1, wherein first and second layers of the gasket are composed of the same material.

3. The fuel cell stack of claim 1, wherein first and second layers of the gasket are composed of different materials.

4. The fuel cell stack of claim 1, wherein a first layer of the gasket comprises an elastic material.

5. The fuel cell stack of claim 4, wherein the elastic material is at least one material selected from the group consisting of ethylenepropylene rubber, silicon, silicon-based rubber, and acryl-based rubber.

6. The fuel cell stack of claim 4, wherein a second layer of the gasket comprises at least one material selected from the group consisting of ethylenepropylene rubber, silicon, silicon-based rubber, and acryl-based rubber.

7. The fuel cell stack of claim 1, wherein the fuel includes a liquid phase fuel and/or a gas phase fuel.

8. The fuel cell stack of claim 1, wherein the separator is a bipolar plate.

9. The fuel cell stack of claim 1, wherein the separator is a monopolar plate.

10. A fuel cell stack, comprising:
a plurality of stacked membrane electrode assemblies;
a plurality of separators, each separator including at least one channel for a flow of fuel and/or oxidant and being closely adhered to one of the membrane electrode assemblies; and
a plurality of gaskets, each gasket having a two-layer structure and being stacked between one of the separators and one of the membrane electrode assemblies, wherein a first gasket layer is seated in a seat groove formed in at least one of the plurality of separators, wherein a second gasket layer contacts at least one of the plurality of stacked membrane electrode assemblies, and wherein the first gasket layer directly contacts the at least one of the membrane electrode assemblies around the second gasket layer in at least two places.

11. A fuel cell stack comprising:

a plurality of membrane electrode assemblies, each comprising an anode electrode, a cathode electrode and an electrolyte membrane positioned between the anode electrode and the cathode electrode;

for each membrane assembly, a first separator adhered to the membrane electrode assembly at a side of the electrolyte membrane having the anode electrode and a second separator adhered to the membrane electrode at a side of the electrolyte membrane having the cathode electrode; and for each membrane assembly, a first gasket having a first layer and a second layer structure stacked between the first separator and the membrane electrode assembly at the side having the anode electrode, the first layer seated in a first seat groove formed in the first separator, the first layer having a thickness greater than the thickness of the second layer, the second layer contacting the anode side of the membrane electrode assembly, the first layer directly contacting the anode side of the membrane electrode assembly around the second layer in at least two places, and a second gasket with a two-layer structure stacked between the second separator and the membrane electrode assembly at the side having the cathode electrode.

12. The fuel cell stack of claim 11, wherein for each membrane electrode assembly, the anode electrode comprises an anode catalyst layer and an anode microporous layer configured to supply a fuel to the anode catalyst layer and the cathode electrode comprises a cathode catalyst layer and an cathode microporous layer configured to supply an oxidant to the cathode catalyst layer and configured to remove water, and wherein the first gasket is configured to prevent fuel from leaking outside the fuel cell stack from the anode microporous layer and the second gasket is configured to prevent oxidant from leaking outside the fuel cell stack from the cathode microporous layer.

13. The fuel cell stack of claim 12 further comprising a fuel manifold configured to supply fuel to the anode microporous layer of each membrane electrode assembly and an oxidant manifold configured to supply an oxidant to the cathode microporous layer of each membrane assembly, and wherein for each membrane assembly, the first gasket is configured to prevent fuel from leaking outside the fuel cell stack from the fuel manifold and the second gasket is configured to prevent oxidant from leaking outside the fuel cell stack from the oxidant manifold.

* * * * *